(12) United States Patent
Kim et al.

(10) Patent No.: US 9,014,627 B2
(45) Date of Patent: Apr. 21, 2015

(54) NEAR FIELD COMMUNICATION (NFC) SECURITY APPARATUS AND METHOD

(71) Applicant: Samsung Electronics Co., Ltd., Suwon-si (KR)

(72) Inventors: Sang Joon Kim, Seoul (KR); Ui Kun Kwon, Hwaseong-si (KR); Seung Keun Yoon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 118 days.

(21) Appl. No.: 13/684,731

(22) Filed: Nov. 26, 2012

(65) Prior Publication Data
US 2013/0178156 A1    Jul. 11, 2013

(30) Foreign Application Priority Data
Jan. 6, 2012    (KR) .................. 10-2012-0001868

(51) Int. Cl.
| | |
|---|---|
| *H04B 5/00* | (2006.01) |
| *H04W 4/00* | (2009.01) |
| *H04W 12/12* | (2009.01) |
| *H04K 3/00* | (2006.01) |
| *H04K 1/02* | (2006.01) |

(52) U.S. Cl.
CPC ............... *H04B 5/00* (2013.01); *H04B 5/0037* (2013.01); *H04B 5/0056* (2013.01); *H04W 4/008* (2013.01); *H04W 12/12* (2013.01); *H04K 3/822* (2013.01); *H04K 3/827* (2013.01); *H04K 1/02* (2013.01); *H04K 3/65* (2013.01); *H04K 3/825* (2013.01)

(58) Field of Classification Search
CPC ........................................................ H04B 5/00
USPC .............................. 455/41.1, 41.2, 343.1, 572
See application file for complete search history.

(56) References Cited

U.S. PATENT DOCUMENTS

| | | | |
|---|---|---|---|
| 2008/0320587 A1* | 12/2008 | Vauclair et al. ................. 726/17 |
| 2009/0041241 A1* | 2/2009 | Dobyns et al. ................. 380/252 |
| 2009/0081943 A1 | 3/2009 | Dobyns et al. | |
| 2010/0164298 A1* | 7/2010 | Karalis et al. ................. 307/104 |
| 2010/0281261 A1 | 11/2010 | Razzell | |

FOREIGN PATENT DOCUMENTS

KR    10-2007-0072051 A    7/2007

* cited by examiner

*Primary Examiner* — Tuan H Nguyen
(74) *Attorney, Agent, or Firm* — NSIP Law

(57) ABSTRACT

A method and apparatus for security of communication devices that communicate with each other in a near field are provided. A Near Field Communication (NFC) security apparatus may detect the presence of a neighboring device other than communication devices, based on a change in a near field. In response to detecting the presence of the neighboring device, the NFC security apparatus may control an amount of energy transmitted by the communication devices such that the neighboring device may be prevented from accurately receiving a signal transmitted between the communication devices.

20 Claims, 13 Drawing Sheets

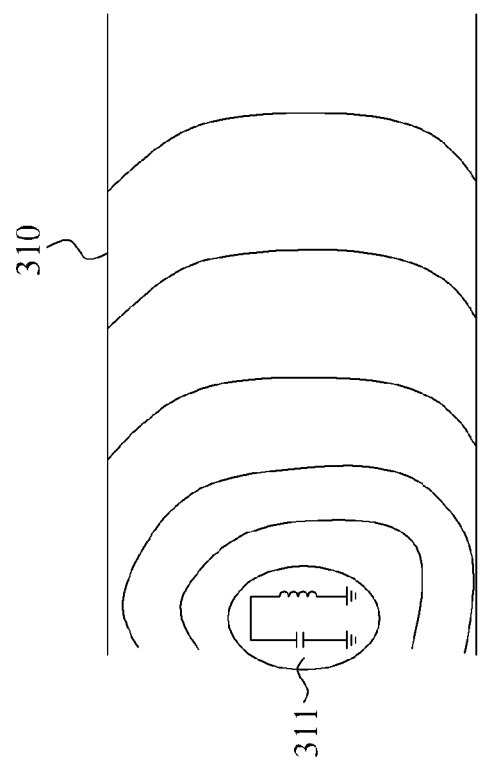

NEAR FIELD COMMUNICATION (NFC) SECURITY APPARATUS AND METHOD

CROSS-REFERENCE TO RELATED APPLICATION(S)

This application claims the benefit under 35 USC §119(a) of Korean Patent Application No. 10-2012-0001868, filed on Jan. 6, 2012, in the Korean Intellectual Property Office, the entire disclosure of which is incorporated herein by reference for all purposes.

BACKGROUND

1. Field

The following description relates to a security method and apparatus for communication devices that communicate with each other in a near field.

2. Description of Related Art

Schemes for providing security in a general communication system includes a public-key encryption scheme or a private key encryption scheme in layer 2, layer 3, or other higher order layers in a Open Systems Interconnection (OSI) model. The public-key encryption scheme or the private key encryption scheme may be used to ensure security based on a mathematical logic, regardless of a physical layer, that is, regardless of a communication channel.

However, if a non-authorized communication device acquires information on how to decrypt an encrypted text sent between communication devices, security between the devices may be useless.

One such type of communication system is a near field communication (NFC) system. NFC is a set of short-range wireless technologies, typically requiring a distance of 4 cm or less between communication devices. NFC operates at 13.56 MHz on ISO/IEC 18000-3 air interface and at rates ranging from 106 kbit/s to 424 kbit/s. NFC typically involves an initiator and a target. The initiator may generate a radio frequency (RF) field that can power a passive target. This enables NFC targets to take very simple forms such as tags, stickers, key fobs, or cards that do not require batteries. In this way, NFC peer-to-peer communication is possible, provided both devices are powered.

Although the communication range of NFC is limited to a few centimeters, NFC alone does not ensure secure communications. Accordingly, NFC communication is vulnerable to various attacks such as man-in-the-middle attacks.

SUMMARY

In an aspect, there is provided a Near Field Communication (NFC) security apparatus to protect a signal transmitted between communication devices, the NFC security apparatus including a sensing unit configured to detect the presence of a neighboring device other than communication devices, based on a change in a near field, and a control unit configured to control an amount of energy transmitted by the communication devices such that the neighboring device is prevented from accurately receiving the signal based on energy received by the neighboring device, in response to the presence of the neighboring device being detected.

Each of the communication devices may comprises a transmitter or a receiver, the transmitter may comprise a source resonator configured to receive energy from a Direct Current (DC) source, and to transmit the energy through mutual resonance, and the receiver may comprise a target resonator configured to receive the energy from the source resonator through the mutual resonance.

The sensing unit may be configured to detect an approach of the neighboring device in the near field, based on a rate of a change in energy stored in either the source resonator or the target resonator.

The control unit may be configured to control the amount of the energy transmitted by the communication devices such that the communication devices transmit random sequences, based on a point in time at which an approach of the neighboring device is detected.

The control unit may be configured to control an amount of energy transmitted by the target resonator such that the target resonator transmits a binary random sequence, after an approach of the neighboring device is detected.

Each of the communication devices may comprises a transmitter or a receiver, the transmitter may comprise a source resonator configured to receive energy from a DC source, to transmit the energy through mutual resonance, and to receive energy from a target resonator, and the receiver may comprise the target resonator to receive energy from the source resonator through the mutual resonance, and to transmit energy that is supplied from an external source to the source resonator.

A direction in which energy is transferred from the source resonator to the target resonator through the mutual resonance may be orthogonal to a direction in which energy is transferred from the target resonator to the source resonator through the mutual resonance, due to a linear combination of energy transmission.

The control unit may be further configured to interrupt the transmission of energy by the communication devices, in response to the presence of the neighboring device being detected.

In an aspect, there is provided a Near Field Communication (NFC) security apparatus, including a sensing unit configured to detect the presence of a neighboring device within a near field, based on a change in the near field, wherein the near field is formed between a source resonator and a target resonator that resonate with each other, and a control unit configured to control an amount of energy transmitted by the source resonator or the target resonator such that the neighboring device is prevented from decrypting a signal transmitted and/or received between the source resonator and the target resonator, in response to detecting the presence of the neighboring device within the near field.

The sensing unit may comprise a calculating unit configured to calculate a rate of a change in energy stored in either the source resonator or the target resonator, and a determining unit configured to determine whether the neighboring device is present, based on the rate of the change calculated by the calculating unit.

The control unit may be further configured to quantize a level of energy supplied to the source resonator, and quantize a level of energy initially stored in the target resonator, in response to a full-duplex communication being performed between the source resonator and the target resonator.

The control unit may be configured to control an amount of energy transmitted by the target device such that the target signal transmits a jamming signal, after the presence of the neighboring device is detected, in response to a half-duplex communication being performed between the source resonator and the target resonator.

In an aspect, there is provided a Near Field Communication (NFC) security method to protect a signal transmitted between communication devices, the NFC security method including detecting the presence of a neighboring device other than communication devices, based on a change in a near field, and controlling an amount of energy transmitted by the communication devices such that the neighboring device is prevented from accurately receiving the signal based on energy received by the neighboring device, in response to the presence of the neighboring device being detected.

Each of the communication devices may comprise a transmitter or a receiver, the transmitter may comprise a source resonator configured to receive energy from a Direct Current (DC) source, and to transmit the energy through mutual resonance, the receiver may comprise a target resonator configured to receive energy from the source resonator through the mutual resonance, and the detecting may comprise detecting an approach of the neighboring device to the near field, based on a rate of a change in energy stored in either the source resonator or the target resonator.

The controlling may comprise controlling the amount of the energy transmitted by the communication devices such that the communication devices transmit random sequences, based on a point in time at which the approach of the neighboring device is detected.

Each of the communication devices may comprises a transmitter or a receiver, the transmitter may comprise a source resonator configured to receive energy from a DC source, to transmit the energy through mutual resonance, and to receive energy from a target resonator, the receiver may comprise the target resonator configured to receive energy from the source resonator through the mutual resonance, and to transmit energy that is supplied from an external source, and the detecting may comprise detecting an approach of the neighboring device to the near field, based on a rate of a change in energy stored in either the source resonator or the target resonator.

The controlling may comprise quantizing a level of energy supplied to the source resonator, and quantizing a level of energy initially stored in the target resonator.

In an aspect, there is provided a near field communication (NFC) receiver including a receiving unit configured to receive a signal transmitted from a transmitter that is included in a NFC communication network, a sensing unit configured to detect the presence of a neighboring device within the NFC communication network, and a transmitting unit configured to transmit an additional signal to prevent the detected neighboring device from accurately receiving the signal transmitted by the transmitter in the NFC network.

The additional signal transmitted by the transmitting unit may comprise a jamming signal.

The additional signal transmitted by the transmitting unit may comprise a random binary bit sequence.

Other features and aspects will be apparent from the following detailed description, the drawings, and the claims.

BRIEF DESCRIPTION OF THE DRAWINGS

FIGS. 3A and 3B are diagrams illustrating examples of a change in a near field based on a number of resonators.

Figure 1:
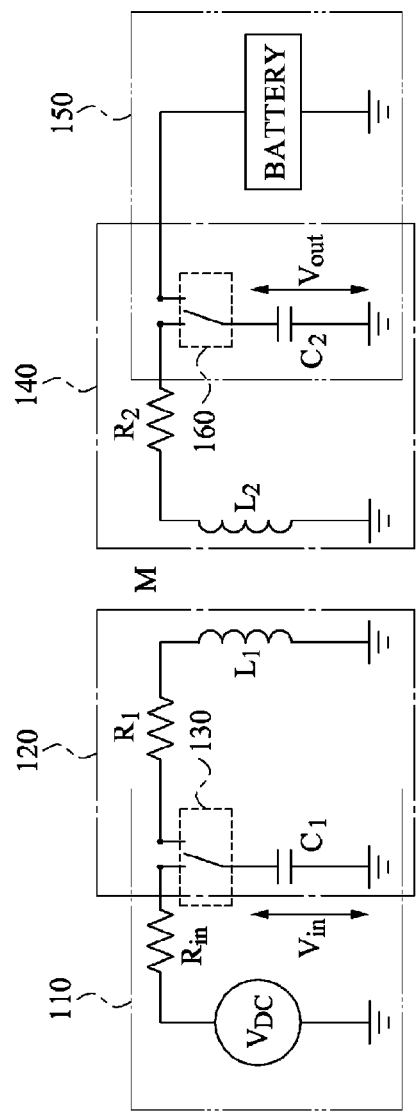
FIG. 1 is a diagram illustrating an example of an equivalent circuit of a communication system using wireless power.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, description of well-known functions and constructions may be omitted for increased clarity to and conciseness.

In a typical far field wireless communication technology, devices communicate using physical characteristics of a traveling wave. In the far field, mutual influence between a transmitter and a receiver may be ignored. For example, the transmitter may not physically detect existence or nonexistence of the receiver, while transmitting a signal. The transmitter may transmit a signal to desired media (for example, free space), and the receiver in the far field may receive the signal transferred through the media.

In the far field channel environment, a communication device other than the transmitter and the receiver may exist in the same channel as the transmitter or the receiver, and there is no physical method of determining whether a signal transmitted by the transmitter is being detected by unauthorized devices. Accordingly, a far field wireless communication system may ensure security using encryption based on a logical scheme in a higher layer, rather than using a security technology in a physical layer.

In a near field channel, devices may individually detect a change due to a change in positions of the devices within the near field. For example, a transmitter may determine whether a receiver exists within the near field by transmitting a signal, and the like. In various aspects herein, the transmitter may also determine whether a device other than the receiver is present within the near field.

A Near Field Communication (NFC) security apparatus in various aspects herein may be applied to a communication system employing a near magnetic field channel such as a NFC system, a Radio Frequency Identification (RFID) system, and the like. Additionally, the NFC security apparatus may be applied to a communication system using wireless power.

Hereinafter, the NFC security apparatus is described based on a communication system using wireless power. The communication system using wireless power may be used to remotely control an information storage device without a power source. The communication system using wireless power may supply power to the information storage device to remotely operate the information storage device, and to wirelessly request information stored in the information storage device.

The communication system using wireless power may store energy in a source resonator. For example, the energy may be supplied from a power supply unit such as an external power supply. The communication system may induce the source resonator to self-resonate by turning off a switch that electrically connects the power supply unit to the source resonator. In this case, a target resonator with the same resonant frequency as the source resonator may be disposed within a distance close enough to resonate with the source resonator. Accordingly, a mutual resonance phenomenon may occur between the source resonator and the target resonator enabling the source resonator to wirelessly supply power to the target resonator thereby wirelessly charging the target resonator.

In the examples herein, the source resonator is a resonator that may receive energy from a power source such as an external power supply unit, and the target resonator is a resonator that may wirelessly receive energy from the source resonator due to the mutual resonance phenomenon. The target resonator may be or may be included in a terminal, for example, a mobile phone, a computer, an RFID, a NFC device, a sensor, an appliance, and the like. The source resonator may supply power to the target resonator so that a device including the target resonator may charge a battery, and the like, without plugging in to a power source using an external cable.

FIG. 1 illustrates an example of an equivalent circuit of a communication system using wireless power. In the example of FIG. 1, a power input unit is physically separated from a power transmitting unit by a capacitor and a switch, and a receiving unit is physically separated from a power output unit by a capacitor and a switch.

Referring to FIG. 1, the communication system has a source-target structure including a source and a target. The communication system using wireless power includes a wireless power transmitting apparatus corresponding to the source, and a wireless power receiving apparatus corresponding to the target. In this example, the source device may transmit power wirelessly to the target device. Accordingly, a battery or the like of the target device may be wirelessly charged with power.

The wireless power transmitting apparatus includes a power input unit 110, a power transmitting unit 120, and a switch unit 130. The power input unit 110 may store energy in a capacitor $C_1$ using a power supply unit. The switch unit 130 may connect the capacitor $C_1$ to the power input unit 110, while the energy is stored in the capacitor $C_1$. To discharge the stored energy, the switch unit 130 may disconnect the capacitor $C_1$ from the power input unit 110 and may connect the capacitor $C_1$ to the power transmitting unit 120. The switch unit 130 may prevent the capacitor $C_1$ from being connected to the power input unit 110 and the power transmitting unit 120 at the same time.

The power transmitting unit 120 may transfer electromagnetic energy to a receiving unit 140, through mutual resonance. In the example of FIG. 1, the power transmitting unit 120 may transfer power through mutual resonance between a transmission coil $L_1$ and a reception coil $L_2$ of the receiving unit 140. The level of the mutual resonance between the transmission coil $L_1$ and the reception coil $L_2$ may be affected by mutual inductance M.

For example, the power transmitting unit 120 may quantize the energy stored in the capacitor $C_1$, and may transmit the quantized energy for a symbol unit. The power transmitting unit 120 may control different amounts of energy to be transmitted for the symbol unit, and may also transmit information. The symbol unit may be used to transfer information on a single bit between a source and a target. As described herein, the symbol unit refers to a period or cycle during which a charged capacitor is discharged through mutual resonance between the source resonator and target resonator, based on an operation of the switch unit 130.

The power input unit 110 may be modeled to an input voltage $V_{DC}$, an internal resistor $R_{in}$, and the capacitor $C_1$, and the power transmitting unit 120 may be modeled to circuit elements $R_1$, $L_1$, and $C_1$, which are based on physical properties corresponding to the power transmitting unit 120. Additionally, the switch unit 130 may be modeled to a plurality of switches. For example, switches may include an active element enabling an on/off function. In FIGS. 1, R, L, and C represent a resistance, an inductance, and a capacitance, respectively. A voltage applied to the capacitor $C_1$ among the input voltage $V_{DC}$ and may be represented by $V_{in}$.

In FIG. 1, the wireless power receiving apparatus includes the receiving unit 140, a power output unit 150, and a switch unit 160. The receiving unit 140 may receive electromagnetic energy from the power transmitting unit 120, and may store the received electromagnetic energy in a connected capacitor $C_2$. For example, the switch unit 160 may connect the capacitor $C_2$ to the receiving unit 140, while the energy is transmitted from the wireless power transmitting apparatus and stored in the capacitor $C_2$. The switch unit 160 may disconnect the capacitor $C_2$ from the receiving unit 140, and may connect the capacitor $C_2$ to the power output unit 150, while the energy in the capacitor $C_2$ is transferred to a load, for example, a battery. Accordingly, the wireless power transmission apparatus may supply power wirelessly to the wireless power receiving apparatus thereby wirelessly charging a load such as a battery. The switch unit 160 may prevent the capacitor $C_2$ from being connected to the receiving unit 140 and the power output unit 150 at the same time.

The reception coil $L_2$ of the receiving unit 140 may receive power through mutual resonance with the transmission coil $L_1$ of the power transmitting unit 120. The received power may be used to charge the capacitor $C_2$ connected to the reception coil $L_2$. The power output unit 150 may transfer the power used to charge the capacitor $C_2$ to the load, for example, the battery. As another example, the power output unit 150 may transfer the power to a load or a target device, instead of the battery.

For example, the receiving unit 140 may receive energy from the power transmitting unit 120 for a symbol unit, and may demodulate information received from the wireless power transmitting apparatus based on an amount of energy received.

The receiving unit 140 may be modeled to basic circuit elements $R_2$, $L_2$, and $C_2$, based on physical properties corresponding to the receiving unit 140, and the power output unit 150 may be modeled to the connected capacitor $C_2$ and the battery. The switch unit 160 may be modeled to a plurality of switches. A voltage applied to the capacitor $C_2$ among energy received by the reception coil $L_2$ may be represented by $V_{out}$.

The above-described communication system enables power to be wirelessly transmitted in an example in which the power input unit 110 is physically separated from the power transmitting unit 120 and the receiving unit 140 is physically separated from the power output unit 150. This communication system is referred to as a 'Resonator Isolation (RI) system.'

The RI system may have various advantages in comparison to a method using impedance matching. For example, the RI system may not need a power amplifier because power may be supplied from a direct current (DC) source directly to a source resonator. Further, the RI system may not require a rectifying operation of a rectifier because energy is captured from power used to charge a capacitor of a receiver. Further, a transmission efficiency is not sensitive to a change in a distance between a transmitter and a receiver because there is no need to perform impedance matching. Additionally, the RI system may be easily extended to a wireless power transmission system including a plurality of transmitters and a plurality of receivers.

Figure 2:
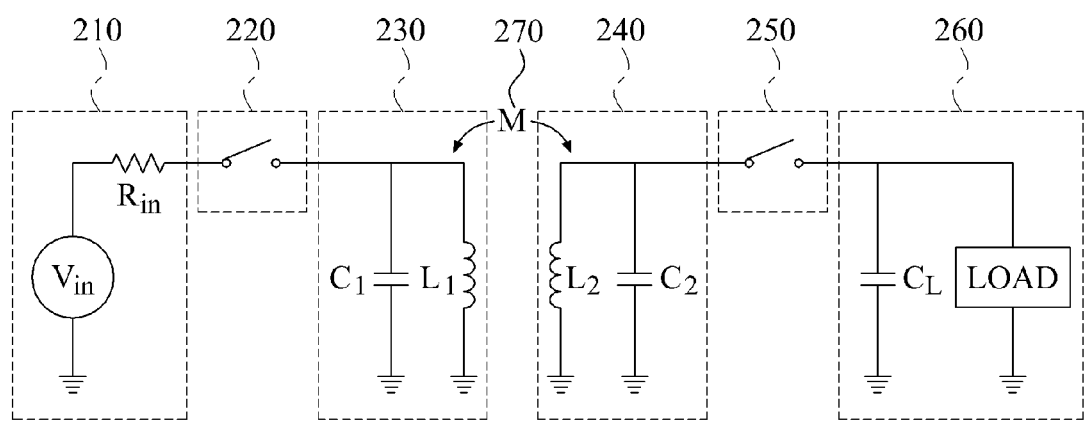
FIG. 2 is a diagram illustrating another example of an equivalent circuit of a communication system using wireless power.

FIG. 2 illustrates an example of an equivalent circuit of a communication system using wireless power. In this example, a power charging unit is physically separated from a transmitting unit by a switch, and a charging unit is physically separated from a power output unit by a switch.

Referring to FIG. 2, the communication system has a source-target structure including a source and a target. The communication system includes a wireless power transmitting apparatus corresponding to the source, and a wireless power receiving apparatus corresponding to the target.

The wireless power transmitting apparatus includes a power charging unit 210, a control unit 220, and a transmitting unit 230. In this example, the power charging unit 210 includes a power supply unit $V_{in}$, and an internal resistor $R_{in}$. In FIG. 2, a capacitor $C_1$ and an inductor $L_1$ may be referred to as a source resonator. In this example, the source resonator corresponds to the transmitting unit 230. The transmitting unit 230 may transmit energy stored in the source resonator to the wireless power receiving apparatus, through mutual resonance between the source resonator and a target resonator.

The control unit 220 may turn on a switch to enable power to be supplied from the power charging unit 210 to the source resonator. A voltage may be applied from the power supply unit $V_{in}$ to the capacitor $C_1$, and current may be applied to the inductor $L_1$. For example, if the inductor $L_1$ and the capacitor $C_1$ reach a steady state, the voltage applied to the capacitor $C_1$ may have a value of '0', and the current flowing in the inductor $L_1$ may have a value of '$V_{in}/R_{in}$.' In the steady state, the source resonator may be charged with power using the current applied to the inductor $L_1$.

For example, if the power used to charge the source resonator in the steady state reaches a predetermined value or a maximum value, the control unit 220 may turn the switch off. Information on the predetermined value may be set by the control unit 220. By turning the switch off, the power charging unit 210 may be separated from the transmitting unit 230. In this example, the source resonator may start self-resonating between the capacitor $C_1$ and the inductor $L_1$. Energy stored in the source resonator may be transferred to the target resonator, through mutual resonance M 270 between the source resonator and the target resonator. A resonant frequency $f_1$ of the source resonator may be the same as a resonant frequency $f_2$ of the target resonator. Additionally, a value of the resonant frequency $f_1$, and a value of resonant frequency $f_2$ may be obtained using the following equations $$f_1 = \frac{1}{2\pi\sqrt{L_1 C_1}}, f_2 = \frac{1}{2\pi\sqrt{L_2 C_2}}.$$

The transmitting unit 230 may quantize the energy stored in the source resonator, and may transmit the quantized energy, for a symbol unit. For example, the transmitting unit 230 may control different amounts of energy to be transmitted for each symbol unit, and may also transmit information. The symbol unit may be used to transfer information on a single bit between a source and a target. As previously mentioned, the symbol unit refers a period or cycle during which a charged capacitor is discharged through mutual resonance between the source resonator and target resonator, based on an operation of the control unit 220.

The wireless power receiving apparatus includes a charging unit 240, a control unit 250, and a power output unit 260. In FIG. 2, a capacitor $C_2$ and an inductor $L_2$ may be referred to as a source resonator. The target resonator corresponds to the charging unit 240. During mutual resonance between the source resonator and the target resonator, the source resonator may be separated from the power supply unit $V_{in}$, and the target resonator may be separated from a load and a capacitor $C_L$, for example, by control unit 220 and 250 having the switches open. The capacitor $C_2$ and the inductor $L_2$ of the charging unit 240 may be charged with power through the mutual resonance.

To charge the target resonator with power, the control unit 250 may turn a switch off (i.e. open). For example, if the switch is turned off, the source resonator and the target resonator may resonate with each other if the target resonator has the same resonant frequency as the source resonator. If the power used to charge the target resonator reaches a predetermined value or a maximum value, the control unit 250 may turn the switch on (i.e. closed). Information on the predetermined value may be set by the control unit 250. By powering the switch on, the capacitor $C_L$ may be connected to the charging unit 240, and the resonant frequency of the target resonator may be changed. A value of the changed resonant frequency of the target resonator may be obtained using an equation $$f_2' = \frac{1}{2\pi\sqrt{L_2(C_2+C_L)}}.$$

Accordingly, the mutual resonance between the source resonator and the target resonator may be terminated. For example, if $f_2'$ is much smaller than $f_2$ based on a Q-factor of the target resonator, a mutual resonance channel may be removed. Additionally, the power output unit 260 may transfer power used to charge the capacitor $C_2$ and the inductor $L_2$ to a load. For example, the power output unit 260 may transfer the power using a scheme based on the load.

If a value of the power used to charge the target resonator is less than a predetermined value, the control unit 250 may turn off the switch. The charging unit 240 may recharge the target resonator with power using the mutual resonance between the source resonator and the target resonator.

For example, the charging unit 240 may receive energy from the transmitting unit 230 for each symbol unit, and may demodulate information received from the wireless power transmitting apparatus based on an amount of energy received.

During the mutual resonance between the source resonator and the target resonator, the switch may not be connected. Accordingly, it is possible to prevent transmission efficiency from being reduced due to a connection to the switch.

In comparison to the communication system of FIG. 1, a scheme for controlling a point in time of capturing energy stored in a target resonator may be performed more easily than a scheme of transferring energy stored in a capacitor. In the scheme of transferring energy stored in a capacitor, only the energy in the capacitor may be captured. However, in a scheme of changing a resonant frequency and capturing energy, energy stored in an inductor and a capacitor of a target resonator may be captured. Accordingly, a degree of freedom for the point in time of capturing energy may be improved.

To transmit power or data, a transmitter in an RI system may repeatedly charge a source resonator with energy and discharge energy through a connection to a switch. In various examples herein, a single charge and discharge of energy may be defined as a single symbol.

Figure 3B:
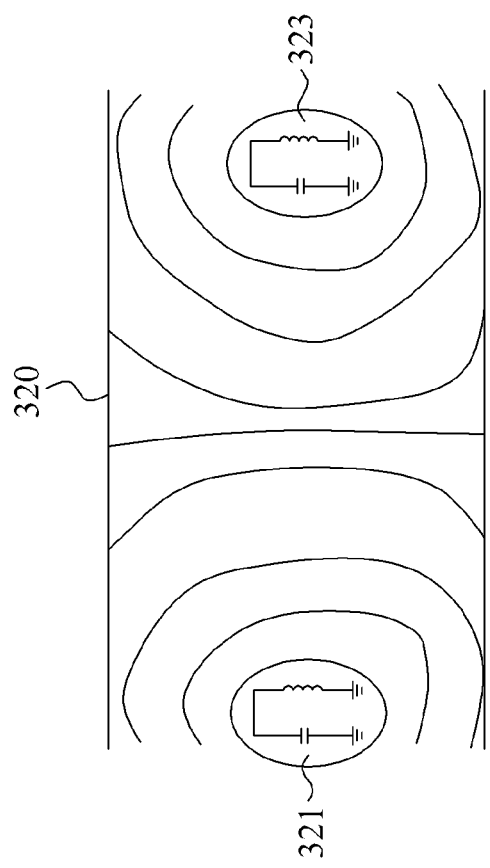

FIGS. 3A and 3B illustrate examples of a change in a near field based on a number of resonators.

Referring to FIG. 3A, a single resonator 311 may form a static magnetic field 310 that exponentially decays around the resonator 311, using energy that is initially stored in the resonator 311. For example, the resonator 311 may refer to a magnetic resonator that includes a capacitor and an inductor.

In this example, a plurality of resonators with the same resonant frequency as the resonator 311 may be present or may become present near the resonator 311. Accordingly, energy stored in each of the resonator 311 and the plurality of resonators may be transferred between the resonator 311 and the plurality of resonators, due to mutual resonance. In this example, each of the plurality of resonators may form a near magnetic field, and the static magnetic field 310 may be changed due to existence of the plurality of resonators.

FIG. 3B illustrates an example of a change in a magnetic field. In FIG. 3B, a second resonator 323 approaches a near magnetic field formed by a first resonator 321.

Accordingly, energy stored in the first resonator 321 may be shared with the second resonator 323, or vice-versa, due to a mutual resonance phenomenon, and the near magnetic field may be changed, so that a new near magnetic field 320 may be formed. As described herein, the term 'near magnetic field' may be interchangeably used with the term 'near field,' and the near field may refer to a magnetic field that has an influence on a predetermined range. For example, a range affected by the near field may be determined based on a type of wireless communication system.

Figure 4:
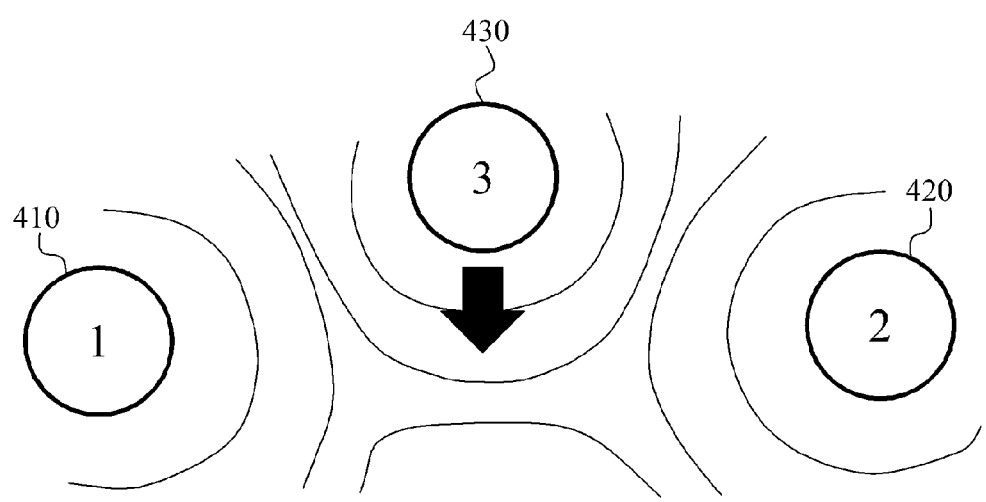
FIG. 4 is a diagram illustrating an example of a near field that changes when a neighboring device is present in the near field in an environment in which a Near Field Communication (NFC) security apparatus is operated.

FIG. 4 illustrates an example of a near field that changes when a neighboring device is present in the near field in an environment in which an NFC security apparatus is operated.

Referring to FIG. 4, energy and information may be transferred using a mutual resonance phenomenon between the resonators in a near field. For example, initial energy may be stored in a first resonator 410. In response to a second resonator 420 being present near the first resonator 410, energy may be transmitted and received between the first resonator 410 and the second resonator 420 due to mutual resonance between the first resonator 410 and the second resonator 420. In this example, the second resonator 420 may capture energy during transmission and reception of the energy, and the energy may be transferred from the first resonator 410 to the second resonator 420.

The information transmitted by the first resonator 410 may be modulated and demodulated, by adjusting an amount of energy transmitted by the first resonator 410, or by sensing an amount of energy transferred to the second resonator 420. The above information transfer method may be referred to as 'Induced Energy (IE) modulation.'

In a linear system, energy may be transferred between two resonators. For example, energy may initially flow in each of the first resonator 410 and the second resonator 420. The direction in which energy stored in the first resonator 410 is transferred to the second resonator 420, may be orthogonal to a direction in which energy stored in the second resonator 420 is transferred to the first resonator 410.

To transfer information using energy between the two resonators, a full-duplex communication may be performed between the two resonators. In a full-duplex communication, both resonators may transmit and receive energy at the same time. During full-duplex communication, a time at which energy is transmitted may be synchronized with time at which energy is received. In this example, during energy transfer between the two resonators, one of the two resonators may expect an amount of energy received from the other resonator at a predetermined point in time after the energy transfer is started.

Referring to FIG. 4, the first resonator 410 and the second resonator 420 form the near field by sharing the initial energy due to the mutual resonance. When a third resonator 430 is present in the near field, the near field may be changed. In this example, the third resonator 430 may have the same resonant frequency as those of the first resonator 410 and the second resonator 420.

Figure 5:
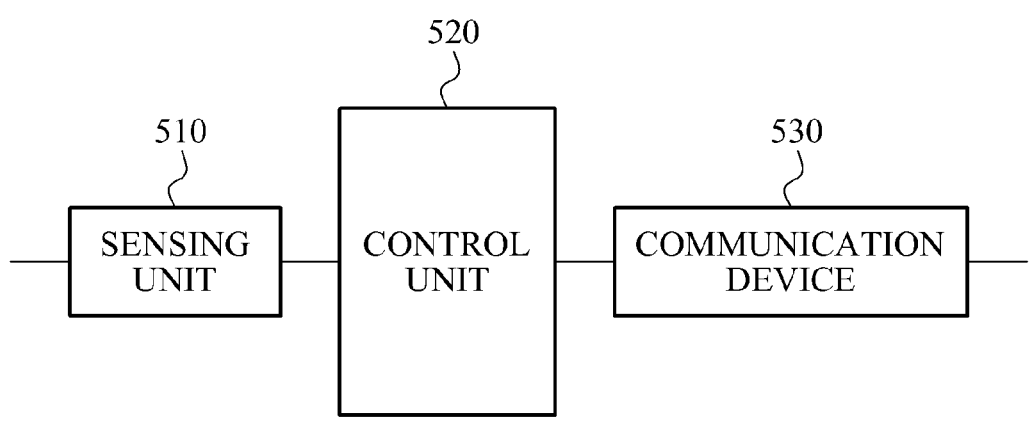
FIG. 5 is a diagram illustrating an example of an NFC security apparatus.

FIG. 5 illustrates an example of an NFC security apparatus.

Referring to FIG. 5, the NFC security apparatus includes a sensing unit 510 and a control unit 520.

The sensing unit 510 may detect an approach of a neighboring device, based on a change in a near field. In this example, the neighboring device may refer to a communication device other than communication devices that are to transmit and receive a signal. The sensing unit 510 may operate after communication begins between the communication devices. For example, the sensing unit 510 may detect a near field formed around the communication devices. In this example, if a change in the near field is greater than a predetermined reference, the sensing unit 510 may determine that the neighboring device is present. The sensing unit 510 may determine the change in the near field, based on a rate of change in energy stored in the communication devices.

In response to the sensing unit 510 detecting the presence of the neighboring device, the control unit 520 may control an amount of energy transmitted by the communication devices so that the neighboring device may be prevented from decrypting the signal using energy received by the neighboring device.

The communication devices may recognize an amount of energy exchanged between the communication devices, based on a preset reference, and may exchange the information with each other. Additionally, the communication devices may perform power estimation on the energy exchanged between the communication devices, and may recognize information.

The neighboring device may receive the energy exchanged between the communication devices from a wireless power transmitting apparatus and a wireless power receiving apparatus, during the exchanging of the energy. Although the energy is received, the neighboring device may not correctly decrypt a signal transmitted and received between the wireless power transmitting apparatus and the wireless power receiving apparatus. For example, the control unit 520 may adjust an amount of energy exchanged between the communication devices, and may enable the neighboring device to acquire distorted information based on energy received by the neighboring device.

A communication device 530 of FIG. 5 may be used as either a source resonator, or a target resonator. The source resonator may supply energy, and the target resonator may receive energy from the source resonator. For example, if the communication device 530 is used as a source resonator, the control unit 520 may quantize energy that is initially stored in the communication device 530, and enable the communication device 530 to transmit, to a target device, energy matched to information among the quantized energy. In this example, the target resonator may receive the energy, may interpret the information based on an amount of energy received, and may recognize the information.

In a half-duplex scheme, only a source resonator may be able to transmit information. For example, the source resonator may receive energy from a DC source and transmit the received energy through mutual resonance, and a target resonator may receive the energy through the mutual resonance.

The sensing unit 510 may determine whether a neighboring device approaches the near field, based on a rate of a change in energy stored in either the source resonator or the target resonator. For example, the sensing unit 510 may detect the rate of change in energy for one or more of the source resonator and the target resonator when only the source resonator and the target resonator exchange signals. The sensing unit 510 may determine a predetermined reference based on the detected rate of change in energy. If the sensing unit senses a change in the rate of energy stored in either the source resonator or the target resonator, and if the rate of change is greater than the predetermined threshold, the sensing unit 510 may determine that another device is now present in the near field.

For example, the control unit 520 may control an amount of energy transmitted so that the communication device 530 may transmit a random sequence, based on a point in time at which the approach of the neighboring device is detected. The random sequence may refer to a predetermined bit sequence. The neighboring device may receive the random sequence, and may acquire distorted information as a result.

The control unit 520 may control an amount of energy transmitted by the target resonator so that the target resonator may transmit a binary random sequence, after the presence of the neighboring device is detected. For example, before the presence of the neighboring device is detected, the control unit 520 may prevent the target resonator from transmitting energy. In response to detecting the presence of the neighboring device, the control unit 520 may control the amount of energy so that the target resonator may transmit a jamming signal.

In a full-duplex scheme, a source resonator may receive energy from a DC source and may transmit the received energy through mutual resonance. In addition, the source resonator may receive energy from a target resonator. Additionally, the target resonator may receive energy from the source resonator through mutual resonance, and may transmit energy that is supplied from an external source. The full-duplex scheme enables the source resonator and the target resonator to exchange information with each other at the same time.

Due to linear combination of energy transmission, a direction in which energy stored in the source resonator is transferred to the target resonator through mutual resonance, and may be orthogonal to a direction in which energy stored in the target resonator is transferred to the source resonator through the mutual resonance. In this example, the source resonator may analyze an amount of energy received from the target resonator, and may demodulate information transmitted by the target resonator. The target resonator may analyze an amount of energy received from the source resonator, and may demodulate information transmitted by the source resonator.

In response to detecting the approach of the neighboring device, the control unit 520 may interrupt transmission of energy between the communication devices such that information which could be hacked by the approaching neighboring device may be prevented from being transmitted.

For convenience, the sensing unit 510, and the control unit 520 are separately illustrated in FIG. 5. In some examples, the control unit 520 may control an overall operation of the NFC security apparatus of FIG. 5, and may perform a function of the sensing unit 510. Accordingly, the control unit 520 may be configured to perform all of the functions, or only a portion of the functions.

Figure 6:
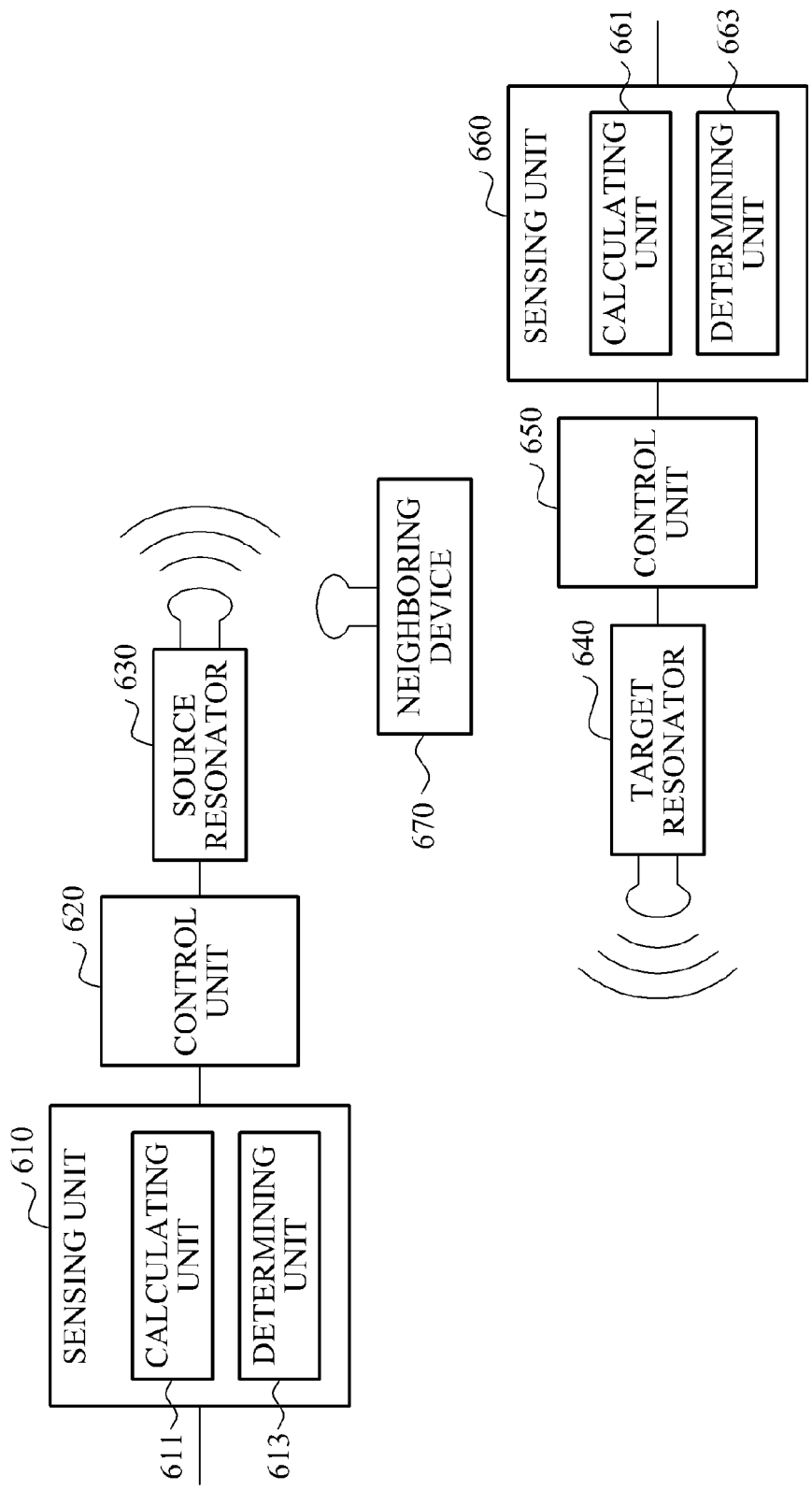
FIG. 6 is a diagram illustrating an example of an NFC security system.

FIG. 6 illustrates an example of an NFC security system.

Referring to FIG. 6, the NFC security system includes a transmitter, and a receiver. The transmitter includes a sensing unit 610, a control unit 620, and a source resonator 630. The receiver includes a target resonator 640, a control unit 650, and a sensing unit 660.

A near field may be formed between the source resonator 630 and the target resonator 640 which resonate with each other. In this example, the sensing unit 610 or the transmitter may detect the existence of a neighboring device 670 within a near field, based on a change in the near field. In addition, the sensing unit 660 of the receiver may detect the existence of the neighboring device 670 based on a change in the near field.

In the example of FIG. 6, the sensing unit 610 includes a calculating unit 611 and a determining unit 613. The calculating unit 611 may calculate a rate of a change in energy stored in either the source resonator 630 or the target resonator 640. The determining unit 613 may determine whether the neighboring device 670 is present, based on the rate of change calculated by the calculating unit 611. For example, the change in the near field may be detected by calculating the rate of the change in energy stored in either the source resonator 630 or the target resonator 640.

In response to detecting the presence of the neighboring device 670, the control unit 620 may control an amount of energy transmitted by the source resonator 630 such that the neighboring device 670 is prevented from decrypting a signal using energy received by the neighboring device 670. The signal may be transmitted between the source resonator 630 and the target resonator 640. For example, the control unit 620 may adjust the amount of the energy transmitted by the source resonator 630, and may cause the neighboring device 670 to acquire distorted information based on an amount of the energy received by the neighboring device 670.

In an example in which full-duplex communication is performed between the source resonator 630 and the target resonator 640, the control unit 620 may quantize a level of energy supplied to the source resonator 630. Information may be matched to the quantized level of the energy.

As previously set forth, the sensing unit 660 may also detect the presence of the neighboring device 670 within the near field, based on the change in the near field. For example, the change in the near field may be determined based on the rate of the change in energy stored in either the source resonator 630 or the target resonator 640.

In the example of FIG. 6, the sensing unit 660 includes a calculating unit 661 and a determining unit 663. The calculating unit 661 may calculate a rate of a change in energy stored in the target resonator 640. The determining unit 663 may determine whether the neighboring device 670 is present, based on the rate calculated by the calculating unit 661.

In response to detecting the presence of the neighboring device 670, the control unit 650 may control an amount of energy transmitted by the target resonator 640 such that the neighboring device 670 may be prevented from decrypting the signal using the energy received by the neighboring device 670.

In an example, when a full-duplex communication is performed between the source resonator 630 and the target resonator 640, the control unit 650 may quantize a level of initial energy stored in the target resonator 640. As another example, if a half-duplex communication is performed between the source resonator 630 and the target resonator 640, the control unit 650 may control an amount of energy transmitted by the target resonator 640 to cause the target resonator 640 to transmit a jamming signal, in response to detecting the presence of the neighboring device 670.

In the half-duplex communication, the target resonator 640 may receive energy from the source resonator 630, however, the target resonator 640 may not transmit energy to the source resonator 630 at the same time of receiving the energy. Therefore, in response to detecting the presence of the neighboring device 670, if the target resonator is not able to transmit energy to the source resonator, the target resonator 640 may transmit a jamming signal to the neighboring device 670. The jamming signal may be, for example, a binary random sequence. Additionally, the jamming signal may be transmitted in the form of quantized energy by the target resonator 640.

Figure 7A:
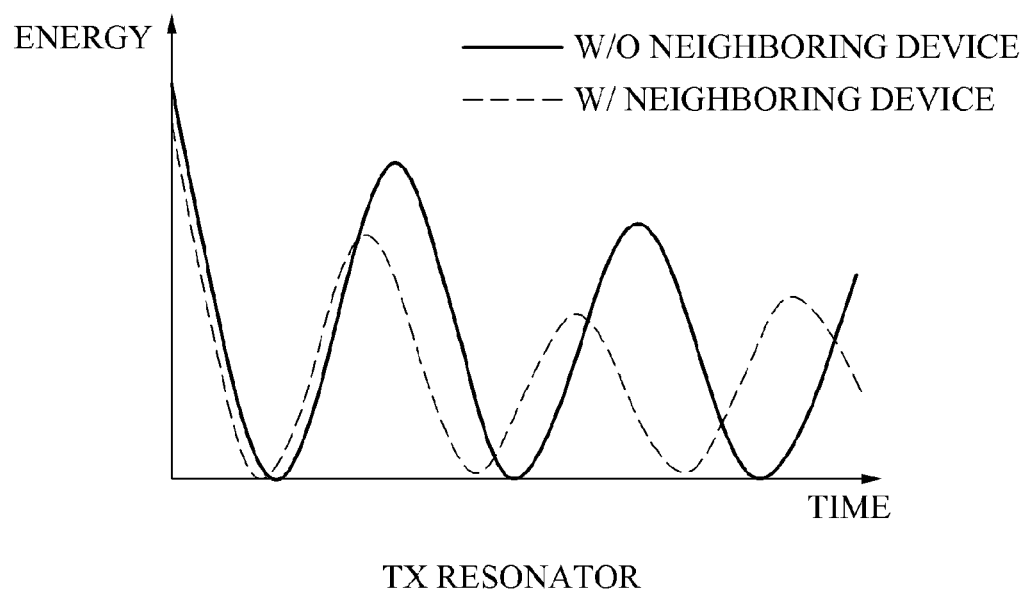
FIGS. 7A and 7B are diagrams illustrating an example of a change in energy stored in a transmitting (TX) resonator and a receiving (RX) resonator, when a neighboring device is present in a near field.
Figure 7B:
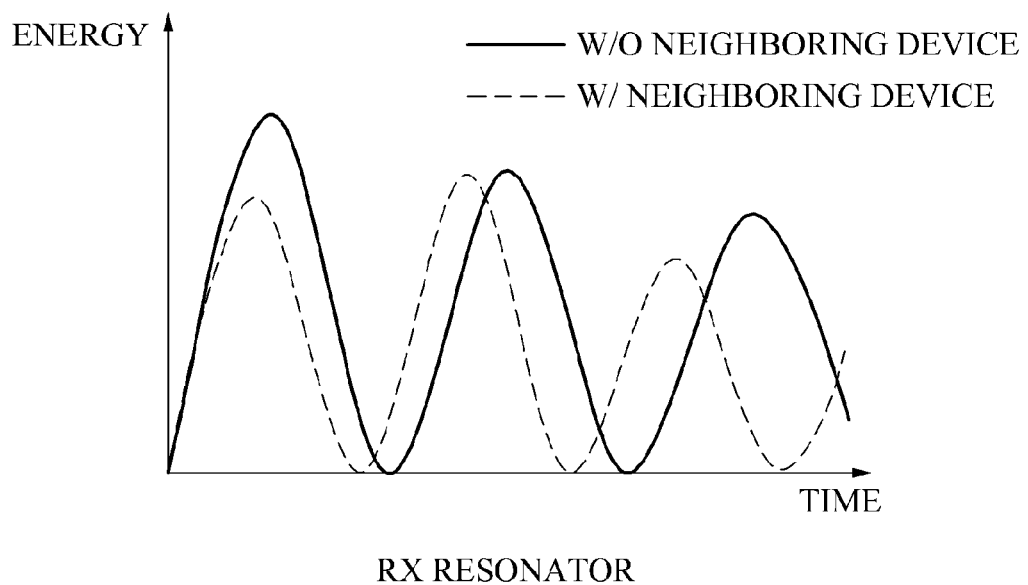

FIGS. 7A and 7B illustrate examples of a change in energy stored in a transmitting (TX) resonator and a receiving (RX) resonator as a neighboring device approaches a near field.

When the neighboring device is present in the near field, energy stored in the TX resonator may be changed as illustrated in FIG. 7A, and energy stored in the RX resonator may be changed as illustrated in FIG. 7B. The TX resonator may be used as a resonator in which energy is initially stored, and may function as a resonator to transmit information by IE modulation. The RX resonator may be used as a resonator without initial energy, and may function as a resonator to receive information.

A waveform of stored energy may change over time, depending on the presence of a neighboring device. The change in stored energy may occur because a change occurs in transmission and reception of energy between the TX resonator and the RX resonator due to a change in the near field. In FIGS. 7A and 7B, a solid line indicates a waveform of energy stored in the TX resonator and the RX resonator when a neighboring device is not present in the near field, and a dotted line indicates a waveform of energy stored in the TX resonator and the RX resonator at a time at which the neighboring device is present within the near field.

When the neighboring device is not present, and energy stored in the TX resonator is shared with the RX resonator, the amount of energy may be greater or less than when the neighboring device is present. In this example, because the neighboring device enters, the energy is exchanged among the TX resonator, the RX resonator, and the neighboring device. Accordingly, energy stored in each of the TX resonator and the RX resonator may be changed.

The above change in energy may be independently sensed by the TX resonator and the RX resonator. For example, if another resonator approaches a near field while information is exchanged between two resonators, the presence of the other resonator may be determined by analyzing a change in the near field, or a rate of a change in energy stored in each of the two resonators.

In the aspects herein, communication security in a near field may be ensured by sensing the other resonator. For example, when the TX resonator detects the presence of another resonator, transmission of information may be interrupted.

Figure 8:
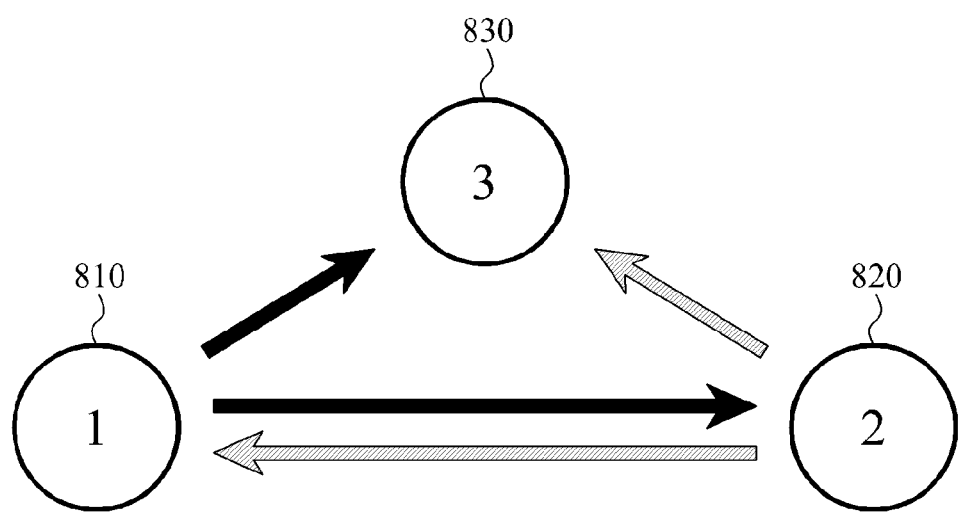
FIG. 8 is a diagram illustrating an example of ensuring security when communication devices perform a full-duplex communication in an NFC security apparatus.

FIG. 8 illustrates an example of ensuring security in communication devices that perform a full-duplex communication in an NFC security apparatus.

Referring to FIG. 8, for example, a first resonator 810 transmits information to a second resonator 820, and a third resonator 830 is present within a near field. In this example, the first resonator 810 and the second resonator 820 may transmit energy using IE modulation so that the third resonator 830 may not accurately interpret the information.

Due to linear combination of energy transmission between resonators, a full-duplex communication may be performed between the first resonator 810 and the second resonator 820, to transfer information. For example, transmission of energy by the second resonator 820 may have little or no influence on reception of information by the second resonator 820. However, energy transmitted from the second resonator 820 to the third resonator 830 may be superposed on energy transmitted by the first resonator 810 and received by the third resonator 830. Accordingly, it is possible to prevent the third resonator 830 from accurately receiving the information.

Figure 9:
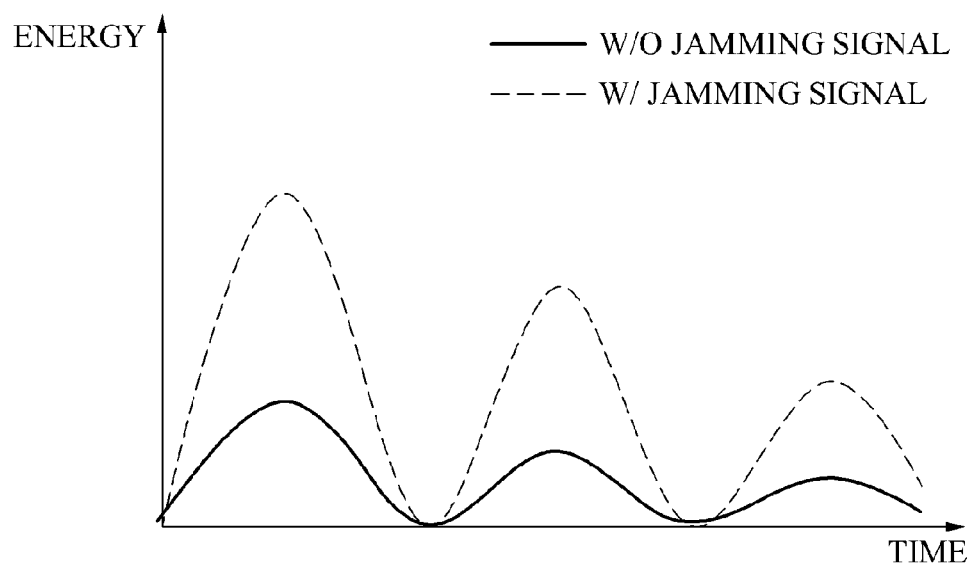
FIG. 9 is a diagram illustrating an example of a change in energy stored in an additional resonator, based on whether a jamming signal is transmitted by an NFC security apparatus.

FIG. 9 illustrates an example of a change in energy stored in an additional resonator, based on whether a jamming signal is transmitted by an NFC security apparatus.

As illustrated in FIG. 9, the energy stored in the additional resonator entering a near field may be changed. In FIG. 9, a solid line indicates a waveform of energy stored in the additional resonator when a jamming signal is not transmitted by the NFC security apparatus, and a dotted line indicates a waveform of energy stored in the additional resonator when a jamming signal is transmitted by the NFC security apparatus. For example, the NFC security apparatus may transmit the jamming signal using an RX resonator.

For example, in response to detecting the presence of the additional resonator, the NFC security apparatus may transmit the jamming signal by an RX resonator operated based on a half-duplex scheme. By transmitting the jamming signal, a greater amount of energy may be induced to the additional resonator in comparison to when the jamming signal is not transmitted. Accordingly, it may be difficult for the additional resonator to interpret information transmitted from a TX resonator to an RX resonator because the additional resonator may acquire the distorted information as a result of the energy additionally induced due to the jamming signal.

Figure 10:
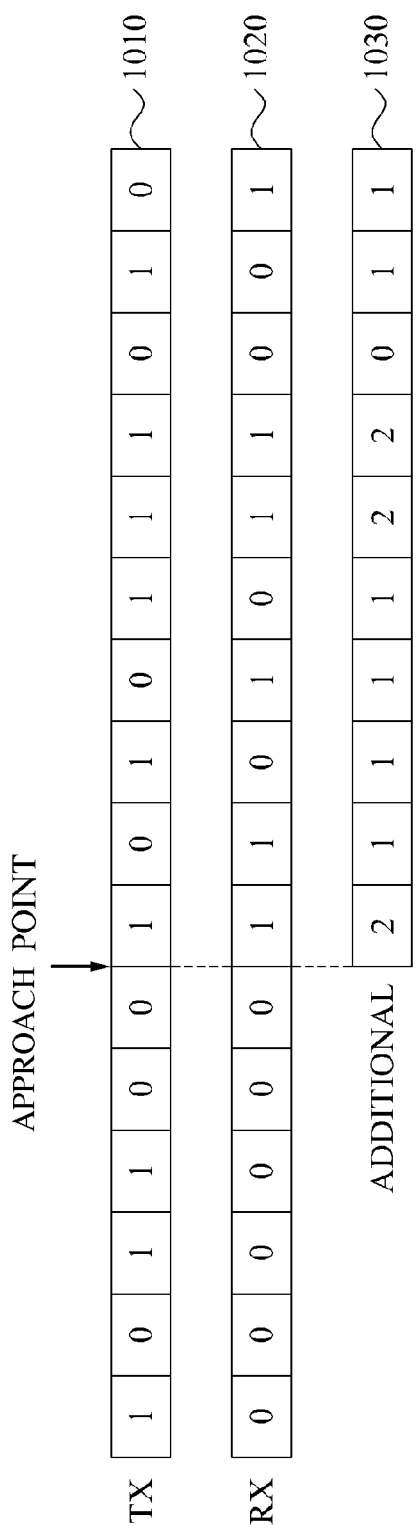
FIG. 10 is a diagram illustrating an example of a sequence received by an additional resonator when a random sequence is transmitted by an NFC security apparatus.

FIG. 10 illustrates an example of a sequence received by an additional resonator when a random sequence is transmitted by an NFC security apparatus.

Referring to FIG. 10, a TX resonator may transmit information to an RX resonator. For example, information 1010 of a binary sequence may be transmitted. An approach point in FIG. 10 indicates a point in time at which the presence of the additional resonator is detected in a near field in which the TX resonator and the RX resonator communicate with each other. In this example, when the additional resonator does not exist in the near field, that is, prior to the approach point, the RX resonator may not transmit energy. However, when the presence of the additional resonator is detected in the near field, that is, after the approach point, the RX resonator may transmit energy based on a binary random sequence 1020, to prevent the additional resonator from accurately interpreting the information 1010 received from the TX resonator. As a result, the additional resonator may acquire distorted information 1030.

For example, a bit '1' of the information 1010 transmitted by the TX resonator immediately after the coming point may be superposed on a bit '1' of the binary random sequence 1020 transmitted by the RX resonator. Accordingly, the additional resonator may interpret the bit '1' of the information 1010 to instead be a value of '2.' In this example, '1010111010' of the information 1010 transmitted by the TX resonator after the coming point may be superposed on '1101011001' of the binary random sequence 1020 transmitted by the RX resonator after the coming point, for each symbol unit. The additional resonator may interpret the superposed sequence to be '2111122011,' and optimally to be '1XXXX110XX,' with the X's corresponding to bit values that cannot be determined by the additional resonator.

Figure 11:
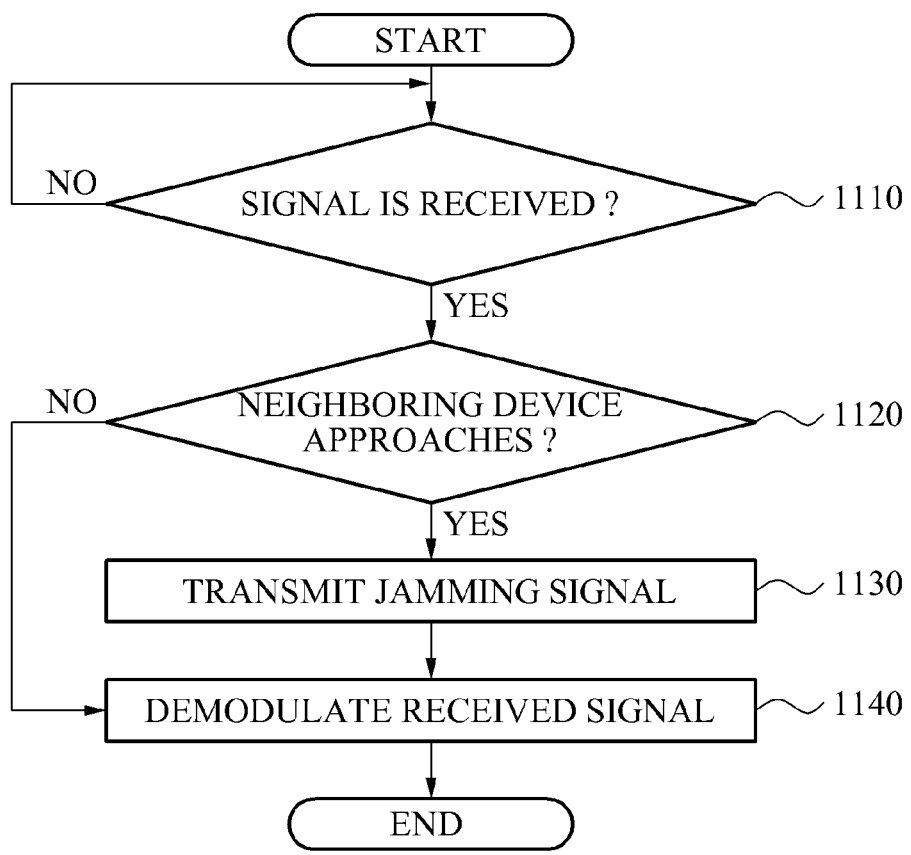
FIG. 11 is a flowchart illustrating an example of an NFC security method.

FIG. 11 illustrates an example of an NFC security method.

Referring to FIG. 11, in 1110, a receiver determines whether a signal is received from a transmitter. In a wireless power transmission system, a signal may be received in the form of energy. For example, different types of information may be transferred based on an amount of energy received during a single symbol period. For example, bits of '1' and '0' may be distinguished based on an amount of energy.

In response to determining that the signal is received, the receiver determines whether a neighboring device is present in a near field, based on a change in the near field in 1120. For example, if the near field formed by the receiver and the transmitter is changed, the receiver may determine that the neighboring device is present in the near field. Additionally, the receiver may receive energy through the target resonator, and may analyze a waveform of energy stored in the target resonator. If a rate of a change in the waveform is greater than a predetermined reference, the receiver may determine that the neighboring device is present.

In response to determining the presence of the neighboring device, the receiver transmits a jamming signal in 1130. The jamming signal may be a random sequence, and may be generated by controlling different amounts of energy stored in the target resonator for each symbol unit. In this example, a signal transmitted by the transmitter is superposed on the jamming signal transmitted by the receiver. Therefore, the neighboring device may acquire distorted information.

In 1140, the receiver demodulates the signal received from the transmitter. In some examples, operations 1130 and 1140 may be simultaneously performed.

According to various aspects, it is possible to detect the presence of a neighboring device based on a change in a near field, when the neighboring device approaches devices that communicate with each other in the near field. The change in the near field may be determined based on a rate of a change in energy stored in one or more of the communication devices.

According to various aspects, a receiver may transmit a random sequence or jamming signal, and thus it is possible to stably receive information from a transmitter, while preventing a neighboring device from decrypting the information during a full-duplex communication channel.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

As a non-exhaustive illustration only, a terminal/device/unit described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A Near Field Communication (NFC) security apparatus to protect a signal transmitted between communication devices, the NFC security apparatus comprising:

a sensing unit configured to detect the presence of a neighboring device other than the communication devices, based on a change in a near field shared by the communication devices; and a control unit configured to control, in response to the presence of the neighboring device being detected, an amount of energy transmitted by the communication devices such that the neighboring device is prevented, based on energy received by the neighboring device from the communication devices, from accurately receiving the signal.

2. The NFC security apparatus of claim 1, wherein each of the communication devices comprises a transmitter or a receiver, the transmitter comprises a source resonator configured to receive energy from a Direct Current (DC) source, and to transmit the energy received from the DC source through mutual resonance, and the receiver comprises a target resonator configured to receive the energy transmitted from the source resonator through the mutual resonance.

3. The NFC security apparatus of claim 2, wherein the sensing unit is configured to detect an approach of the neighboring device in the near field, based on a rate of a change in energy stored in either the source resonator or the target resonator.

4. The NFC security apparatus of claim 2, the control unit is configured to control an amount of energy transmitted by the target resonator such that the target resonator transmits a binary random sequence, after an approach of the neighboring device is detected.

5. The NFC security apparatus of claim 1, the control unit is configured to control the amount of the energy transmitted by the communication devices such that the communication devices transmit random sequences, based on a point in time at which an approach of the neighboring device is detected.

6. The NFC security apparatus of claim 1, wherein each of the communication devices comprises a transmitter or a receiver, the transmitter comprises a source resonator configured to receive energy from a DC source, to transmit the energy received from the DC source through mutual resonance, and to receive energy from a target resonator, and the receiver comprises the target resonator to receive energy from the source resonator through the mutual resonance, and to transmit energy that is supplied from an external source to the source resonator.

7. The NFC security apparatus of claim 6, wherein a direction in which energy is transferred from the source resonator to the target resonator through the mutual resonance is orthogonal to a direction in which energy is transferred from the target resonator to the source resonator through the mutual resonance, due to a linear combination of energy transmission.

8. The NFC security apparatus of claim 1, wherein the control unit is further configured to interrupt the transmission of energy by the communication devices, in response to the presence of the neighboring device being detected.

9. A Near Field Communication (NFC) security apparatus, comprising:

a sensing unit configured to detect the presence of a neighboring device within a near field, based on a change in the near field, wherein the near field is formed between a source resonator and a target resonator that resonate with each other, and wherein the neighboring device is a device other than the source resonator and the target resonator; and a control unit configured to control, in response to detecting the presence of the neighboring device with the near field, an amount of energy transmitted by the source resonator or the target resonator such that the neighboring device is prevented, based on energy received by the neighboring device from the source resonator or the target resonator, from decrypting a signal transmitted and/or received between the source resonator and the target resonator.

10. The NFC security apparatus of claim 9, wherein the sensing unit comprises:

a calculating unit configured to calculate a rate of a change in energy stored in either the source resonator or the target resonator; and a determining unit configured to determine whether the neighboring device is present, based on the rate of the change calculated by the calculating unit.

11. The NFC security apparatus of claim 9, wherein the control unit is further configured to quantize a level of energy supplied to the source resonator, and quantize a level of energy initially stored in the target resonator, in response to a full-duplex communication being performed between the source resonator and the target resonator.

12. The NFC security apparatus of claim 9, wherein the control unit is configured to control an amount of energy transmitted by the target resonator such that the target resonator transmits a jamming signal, after the presence of the neighboring device is detected, in response to a half-duplex communication being performed between the source resonator and the target resonator.

13. A Near Field Communication (NFC) security method to protect a signal transmitted between communication devices, the NFC security method comprising:

detecting the presence of a neighboring device other than the communication devices, based on a change in a near field shared by the communication devices; and controlling, in response to the presence of the neighboring device being detected, an amount of energy transmitted by the communication devices such that the neighboring device is prevented, based on energy received by the neighboring device from the communication devices, from accurately receiving the signal.

14. The NFC security method of claim 13, wherein each of the communication devices comprises a transmitter or a receiver, the transmitter comprises a source resonator configured to receive energy from a Direct Current (DC) source, and to transmit the energy received from the DC source through mutual resonance, the receiver comprises a target resonator configured to receive energy from the source resonator through the mutual resonance, and the detecting comprises detecting an approach of the neighboring device to the near field, based on a rate of a change in energy stored in either the source resonator or the target resonator.

15. The NFC security method of claim 14, wherein the controlling comprises controlling the amount of the energy transmitted by the communication devices such that the communication devices transmit random sequences, based on a point in time at which the approach of the neighboring device is detected.

16. The NFC security method of claim 13, wherein each of the communication devices comprises a transmitter or a receiver, the transmitter comprises a source resonator configured to receive energy from a DC source, to transmit the energy through mutual resonance, and to receive energy from a target resonator, the receiver comprises the target resonator configured to receive energy from the source resonator through the mutual resonance, and to transmit energy that is supplied from an external source, and the detecting comprises detecting an approach of the neighboring device to the near field, based on a rate of a change in energy stored in either the source resonator or the target resonator.

17. The NFC security method of claim 16, wherein the controlling comprises quantizing a level of energy supplied to the source resonator, and quantizing a level of energy initially stored in the target resonator.

18. A near field communication (NFC) receiver, comprising:

a receiving unit configured to receive a signal transmitted from a transmitter that is included in a NFC communication network;

a sensing unit configured to detect the presence of a neighboring device within the NFC communication network, wherein the neighboring device is a device other than the transmitter; and a transmitting unit configured to transmit an additional signal to prevent the detected neighboring device from accurately receiving the signal transmitted by the transmitter in the NFC network.

19. The NFC receiver of claim 18, wherein the additional signal transmitted by the transmitting unit comprises a jamming signal.

20. The NFC receiver of claim 18, wherein the additional signal transmitted by the transmitting unit comprises a random binary bit sequence.

* * * * *